United States Patent [19]

Ota et al.

[11] Patent Number: 5,656,120

[45] Date of Patent: Aug. 12, 1997

[54] METHOD OF FIXING OPTICAL FIBER ARRAY TO SUBSTRATE

[75] Inventors: Takashi Ota, Kasugai; Masashi Fukuyama, Inuyama, both of Japan

[73] Assignee: NGK Insulators, Ltd., Japan

[21] Appl. No.: 483,890

[22] Filed: Jun. 7, 1995

[30] Foreign Application Priority Data

Jul. 28, 1994 [JP] Japan .................................. 6-176783

[51] Int. Cl.$^6$ .............................. G02B 6/38; G02B 6/42
[52] U.S. Cl. .................... 156/293; 156/158; 156/304.1; 385/49; 385/95; 385/97
[58] Field of Search ..................... 156/153, 154, 156/157, 158, 304.1, 304.5, 293; 385/49, 95, 97

[56] References Cited

U.S. PATENT DOCUMENTS

| 4,639,074 | 1/1987 | Murphy . |
| 4,875,969 | 10/1989 | Hsu et al. . |

FOREIGN PATENT DOCUMENTS

| 0331334 | 9/1989 | European Pat. Off. . | |
| 0388642 | 9/1990 | European Pat. Off. . | |
| 0403761 | 12/1990 | European Pat. Off. . | |
| 0504882 | 9/1992 | European Pat. Off. | 385/49 |
| 0541820 | 5/1993 | European Pat. Off. . | |
| 0564207 | 10/1993 | European Pat. Off. . | |
| 0573288 | 12/1993 | European Pat. Off. . | |
| 3902022 | 7/1990 | Germany . | |
| 55-45051 | 3/1980 | Japan . | |
| 55-95916 | 7/1980 | Japan | 385/49 |
| 57-58112 | 4/1982 | Japan . | |
| 61-61111 | 3/1986 | Japan . | |
| 63-278004 | 11/1988 | Japan . | |
| 2-125209 | 5/1990 | Japan . | |
| 421803 | 1/1992 | Japan | 385/49 |
| 4251806 | 9/1992 | Japan | 385/49 |
| 5134135 | 5/1993 | Japan | 385/49 |
| 2191601 | 12/1987 | United Kingdom . | |

OTHER PUBLICATIONS

Patent Abstracts of Japan, vol. 17, No. 372 (P-1573) Jul. 1993.

IBM Technical Disclosure Bulletin, vol. 31, No. 10 Mar. 1989, pp. 384-387.

*Primary Examiner*—Jeff H. Aftergut
*Attorney, Agent, or Firm*—Parkhurst, Wendel & Burr, L.L.P.

[57] ABSTRACT

In the case of fixing an optical fiber array to a substrate, wherein the optical fiber includes a V-groove substrate having at least one V-groove used for arranging an optical fiber, a fix substrate for fixing the optical fiber in the V-groove, and a pair of guide grooves arranged at both ends of the V-groove through which a guide pin used for a connection is arranged, the guide pin is arranged in the guide groove and the optical fiber array is fixed to the substrate under such a condition that one point of the guide pin is brought into contact with the substrate.

5 Claims, 5 Drawing Sheets

FIG._2
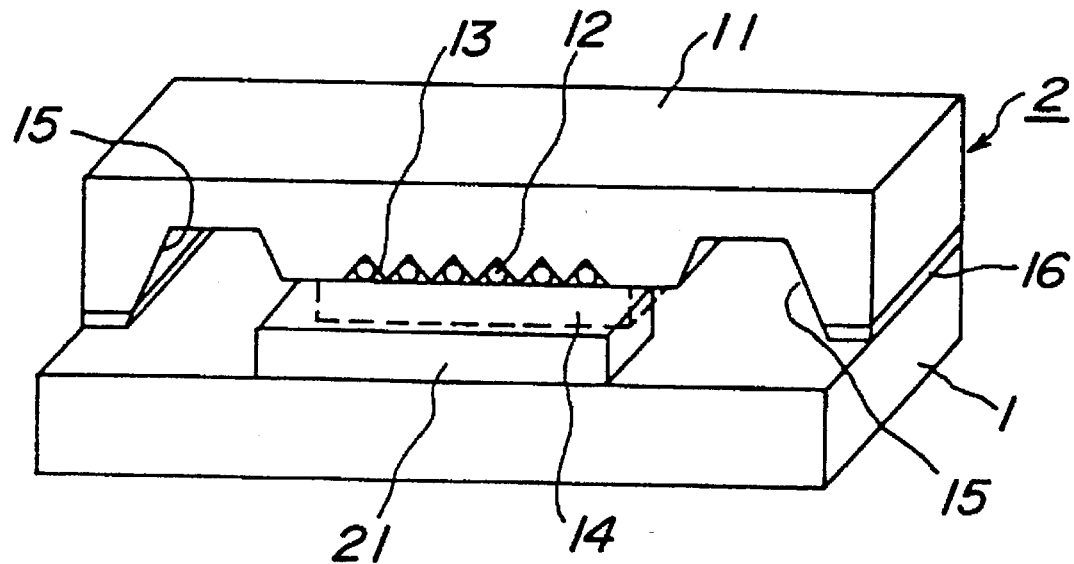
FIG._3
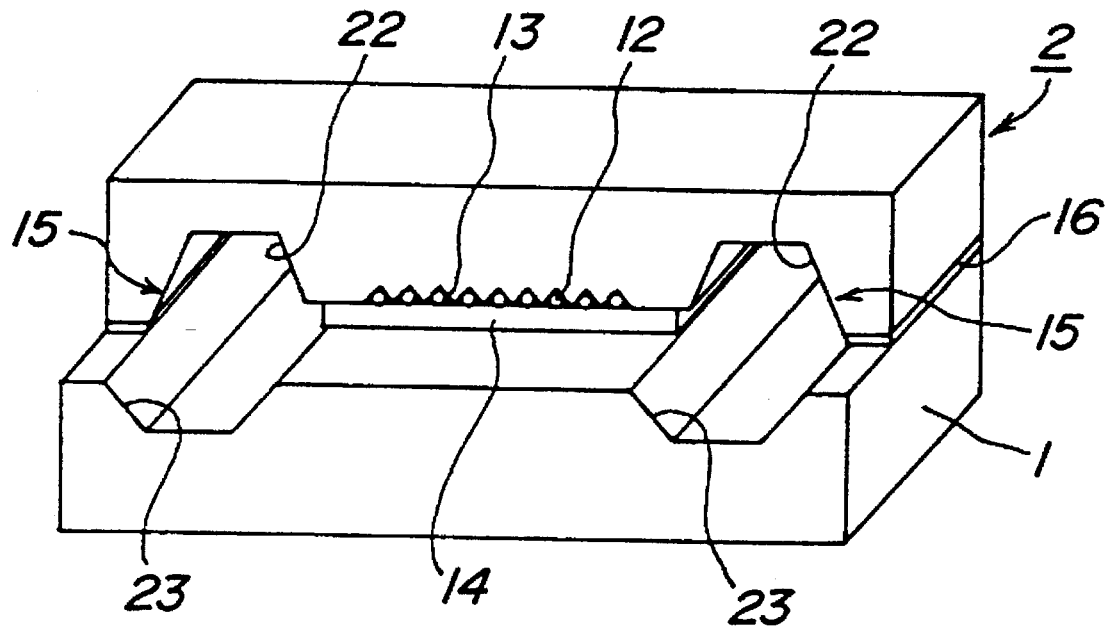

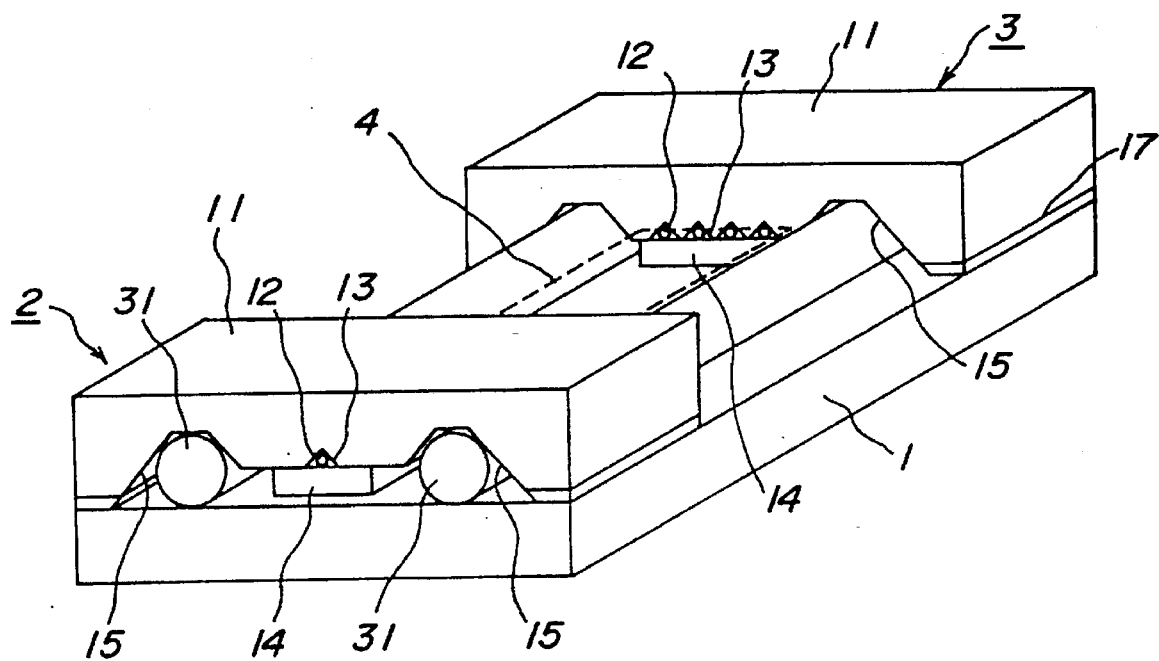
FIG_5

FIG_6
PRIOR ART
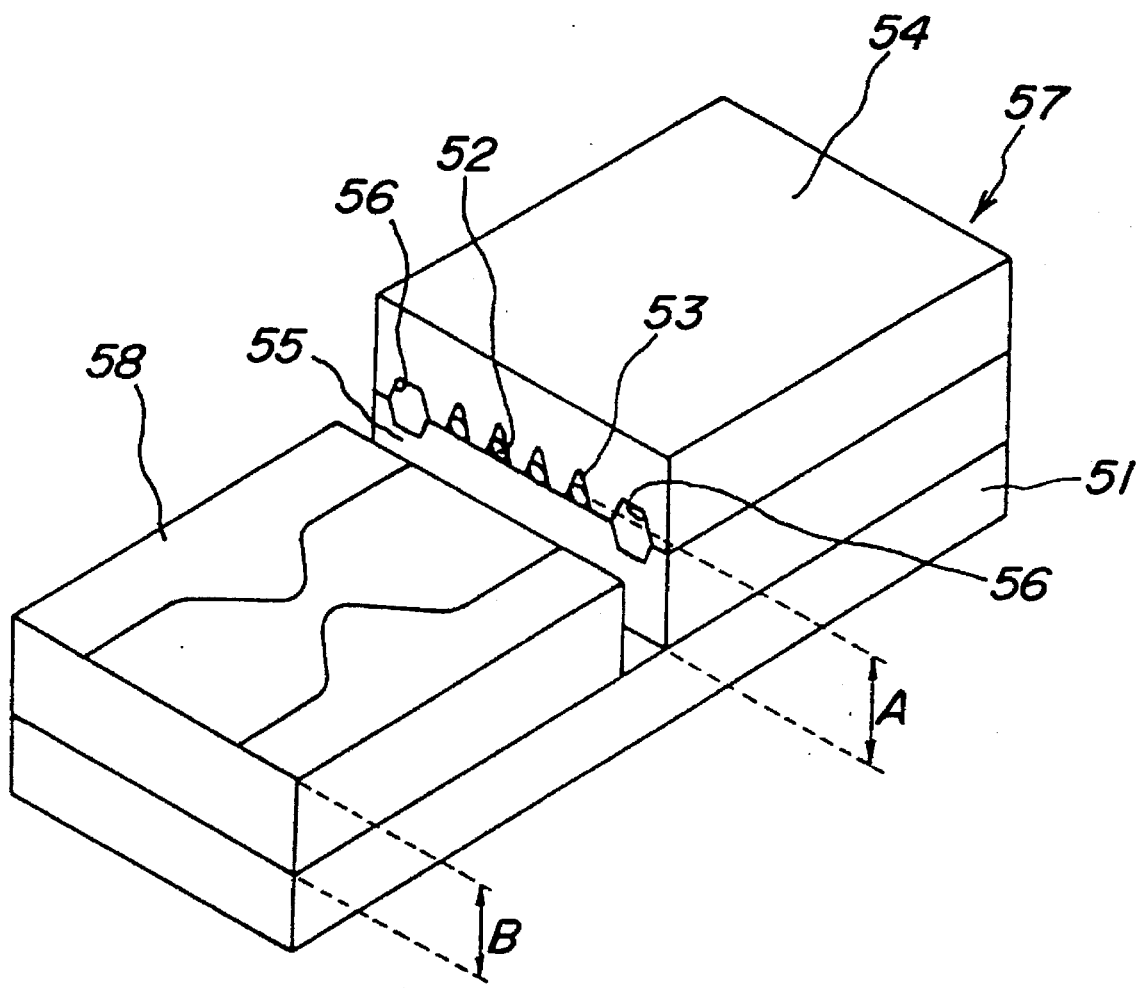

METHOD OF FIXING OPTICAL FIBER ARRAY TO SUBSTRATE

BACKGROUND OF THE INVENTION

1. Field of the Invention

The present invention relates to a method of fixing an optical fiber array to a substrate, which can fix the optical fiber array to the substrate precisely in a thickness direction.

2. Related Art Statement

FIG. 6 is a schematic view for explaining a known method of fixing an optical fiber array to a substrate. In FIG. 6, an optical fiber array 57 comprises a V-groove substrate 54 having a plurality of V-grooves 53 used for fixing optical fibers 52, a fix substrate 55 for fixing the optical fibers 52 in the V-grooves 53, and a pair of guide grooves 56 arranged at both ends of the V-grooves 53 of the V-groove substrate 54. When the optical fiber array 57 having the construction mentioned above is fixed to an element mount substrate 51, it is necessary to set precisely a position of the optical fiber 52 with respect to the element mount substrate 51 i.e. a distance A in a thickness direction. This is because, as shown in FIG. 6, the optical fiber array 57 and an optical element 58 such as an optical waveguide or the like must be fixed on the element mount substrate 51 in such a manner that optical axes of the optical element 58 are optically made identical with those of the optical fibers 52 of the optical fiber array 57.

In the known embodiment mentioned above, in order to set precisely the distance A in the thickness of the optical fiber array 57 and a distance B in the thickness direction of the optical element 58, they are worked with reference to the surfaces, to which the element mount substrate 51 is contacted, in such a manner that distances from those reference surfaces are made equal to the distances A and B. In this case, the distance B in the thickness direction of the optical element 58 can be worked relatively easily to a precise value since a shape to be worked is simple. However, it is difficult to work the distance A in the thickness direction of the optical fiber array to a precise value, since a shape to be worked is complicated.

Therefore, the optical axes of the optical fiber array 57 and the optical element 58 are made identical with each other in such manner that a light transmitted through both of the optical fiber array 57 and the optical element 58 is monitored while they are moved relatively on the element mount substrate 52 and they are fixed to the element mount substrate 51 at which a power of the monitored light is largest. In this case, if the distance A in the thickness direction of the optical fiber array 57 is inaccurate as mentioned above, a space is generated between the element mount substrate 51 and the optical element 58 or the optical fiber array 57, and thus it is necessary to fill adhesives into the space. Therefore, a stress due to a shrinkage or expansion of the adhesives is generated in the thickness direction, and thus it is feared that a reliability of the optical connection is deteriorated.

SUMMARY OF THE INVENTION

An object of the present invention is to eliminate the drawbacks mentioned above and to provide a method of fixing an optical fiber array to a substrate, which can fix the optical fiber array to the substrate precisely in a thickness direction.

According to the present invention, a method of fixing an optical fiber array to a substrate, the optical fiber array including a V-groove substrate having at least one V-groove used for arranging an optical fiber, a fix substrate for fixing said optical fiber in said V-groove, and a pair of guide grooves arranged at both ends of said V-groove through which a guide pin used for a connection is arranged, is characterized in that said guide pin is arranged in said guide groove and said optical fiber array is fixed to said substrate under such a condition that one point of said guide pin is brought into contact with said substrate.

In the construction mentioned above, the guide pin is arranged in the guide groove arranged in the V-groove, and the optical fiber array is fixed to the substrate under such a condition that one point of the guide pin is brought into contact with the substrate. In this case, the V-groove can be worked precisely to an extent such that a relative positional relation between a center of the guide pin and a center of the optical fiber becomes on the an order of sub-microns if the guide pin and the optical fiber are set in the guide groove and the V-groove. Therefore, it is possible to set a distance from a surface of the substrate on which the element is mounted to the optical fiber precisely on the order of sub-microns. Accordingly, since the optical axes of the optical element and the optical fiber array are identical with each other in a thickness direction thereof, it is possible to perform easily an optical axis adjusting operation between the optical element and the optical fiber array when they are fixed to the same substrate.

BRIEF DESCRIPTION OF THE DRAWINGS

FIG. 2 is a schematic view illustrating another embodiment for performing the method of fixing the optical fiber array to the substrate according to the invention;

FIG. 3 is a schematic view depicting still another embodiment for performing the method of fixing the optical fiber array to the substrate according to the invention;

FIG. 5 is a schematic view illustrating still another embodiment for performing the method of fixing the optical fiber array to the substrate according to the invention; and FIG. 6 is a schematic view depicting one embodiment of a known method of fixing an optical fiber array.

DESCRIPTION OF THE PREFERRED EMBODIMENT

Figure 1:
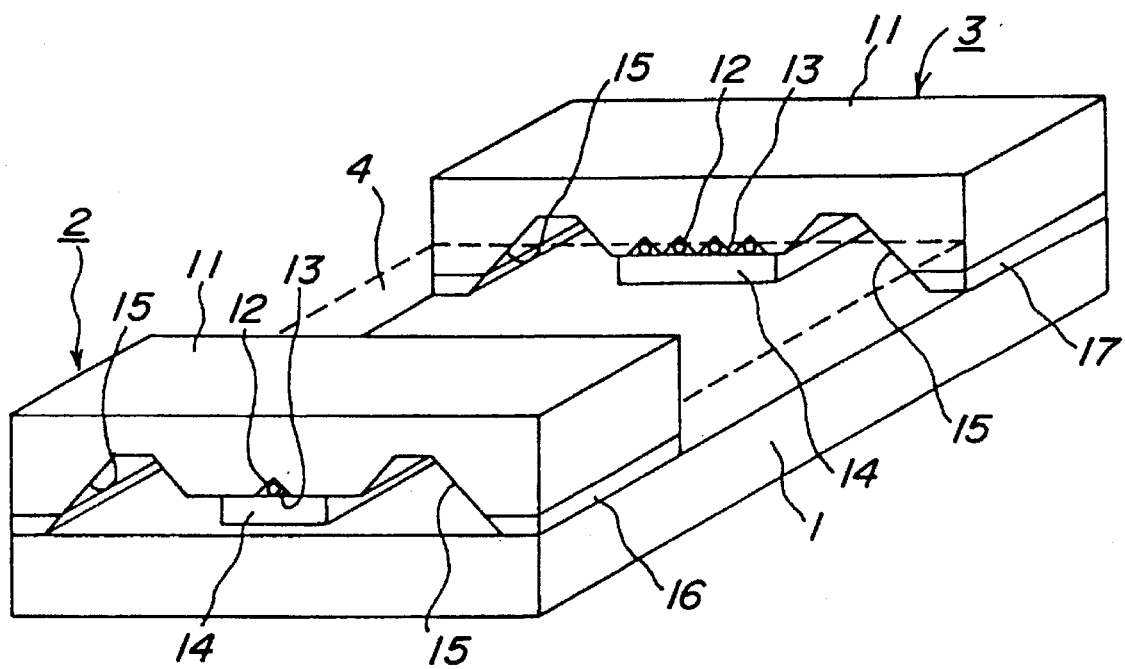
FIG. 1 is a schematic view showing one embodiment for performing a method of fixing an optical fiber array to a substrate according to the invention.

FIG. 1 is a schematic view showing one embodiment of 1×4 optical splitter utilizing a method of fixing an optical fiber array to a substrate according to the invention. In the embodiment shown in FIG. 1, numeral 1 is an element mount substrate, numeral 2 is an optical fiber array arranged on the element mount substrate 1 at its light incident side, numeral 3 is an optical fiber array arranged on the element mount substrate 1 at its light emitting side, and a numeral 4 is an optical waveguide element arranged between the optical fiber arrays 2 and 3.

The optical fiber array 2 has a construction such that a V-groove 13 for fixing an optical fiber 12, a fix substrate 14 used for fixing the optical fiber 12 arranged in the V-groove 13, and a pair of guide grooves 15 arranged at both ends of the V-groove 13, in which a guide pin (not shown) is arranged, are arranged on a V-groove substrate 11. The optical fiber array 3 has the same construction as that of the optical fiber array 2 except that four V-grooves 13 are arranged in the V-groove substrate 11. Then, the optical fiber array 2 and the optical fiber array 3 are fixed on the element mount substrate 1 via adhesive layers 16 and 17 respectively. Moreover, the optical waveguide element 4 is fixed on the element mount substrate 1 via an adhesive layer in such a manner that an optical axis thereof at its light incident side is made identical with that of the optical fiber 12 of the optical fiber array 2, and optical axes thereof at its light emitting side are made identical with those of the optical fibers 12 of the optical fiber array 3.

FIGS. 2 and 3 are schematic views respectively showing one embodiment of a photoelectric converting module utilizing the method of fixing the optical fiber array to the substrate according to the invention. In FIGS. 2 and 3, portions similar to those of FIG. 1 are denoted by the same reference numerals, and the explanation thereof is omitted here. In the embodiment shown in FIG. 2, the photoelectric converting module has a construction such that the optical fiber array 2 of the light incident side is arranged on the element mount substrate 1 and a light receiving element 21 is arranged correspondingly to the optical fibers 12 of the optical fiber array 2. In the embodiment of FIG. 3 showing a variation of FIG. 2, the guide groove 15 is constructed by a guide groove portion 22 formed in the optical fiber array and a guide groove portion 23 formed in the element mount substrate 1. It should be noted that the construction of the guide groove 15 shown in FIG. 3 can be applied to the embodiment shown in FIG. 1. Moreover, as for the optical element, use may be made of a light emitting element instead of the light receiving element.

Figure 4A:
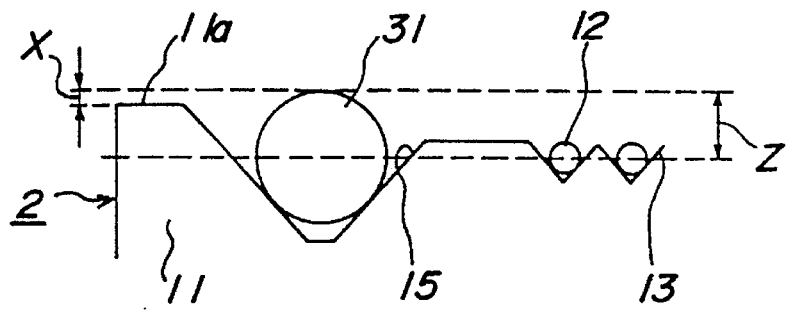
FIGS. 4a to 4d are schematic views respectively showing a step of the method of fixing the optical fiber array to the substrate according to the invention.

FIGS. 4a to 4d are schematic views respectively showing a step of the method of fixing the optical fiber array to the substrate according to the invention. At first, as shown in FIG. 4a, the V-grooves 13 and the guide grooves 15 are formed in the V-groove substrate 11 on the order of sub-microns. In this case, it is necessary to set a distance Z equal to a distance between the element mount substrate 1 and an optical axis of the optical element such as the optical waveguide element 4 and the light receiving element 21. Here, the distance Z means a distance between an optical axis of the optical fiber 12 and a point of a guide pin 31, at which the element mount substrate 1 is contacted, under such a condition that the optical fibers 12 and the guide pins 31 are arranged in the V-grooves 13 and the guide grooves 15 respectively.

Moreover, an end portion 11a (forming lateral joining surfaces) of the V-groove substrate 11 is worked by a distance X from a position at which the element mount substrate 1 is arranged so as to provides a gap for the adhesive layers 16, 17. Further, it is not necessary to set the optical axis of the optical fiber 12 equal to a center position of the guide pin 31 precisely in the thickness direction. However, in the case that the optical fiber array 2 is directly connected to the optical connector having a single optical fiber or a plurality of optical fibers via the guide pin 31, it is preferred to make identical the optical axis of the optical fiber 12 with the center position of the guide pin 31 in the thickness direction as shown in FIG. 4a, since a position of the optical fiber 12 of the optical fiber array 2(3) can be arranged relatively equal to a position of the optical fiber of the optical connector (not shown).

Figure 4B:
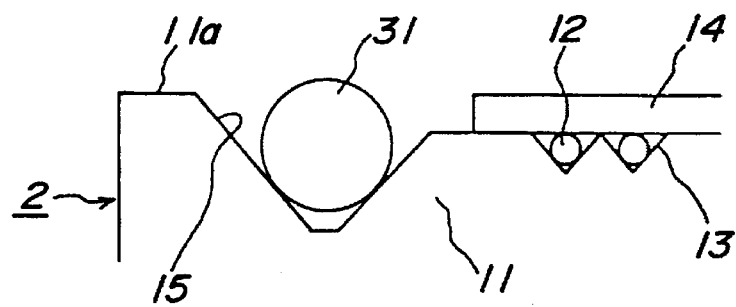
Figure 4C:
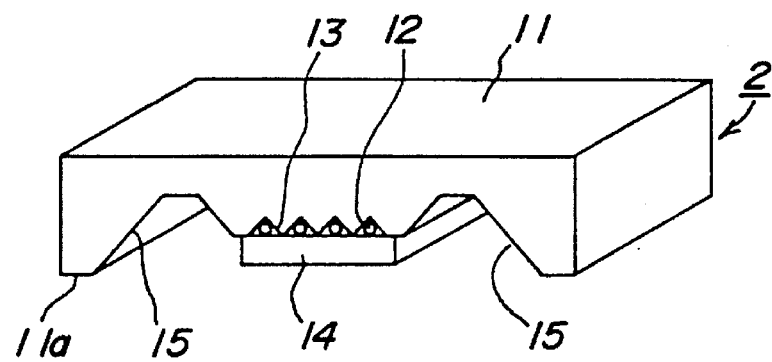

Then, as shown in FIG. 4b, the optical fibers 12 are arranged in the V-grooves 13 of the V-groove substrate 11 and are fixed by the fix substrate 14 via adhesives. In this case, it is necessary to set a thickness of the fix substrate 14 thinner than the distance Z mentioned above such that the guide pin 31 always contacts the element mount substrate 1. After that, as shown in FIG. 4c, both end surfaces of the optical fiber array 2(3), to which the optical fiber 12 is exposed, are optically ground to obtain the optical fiber array 2(3) as manufactured articles.

Figure 4D:
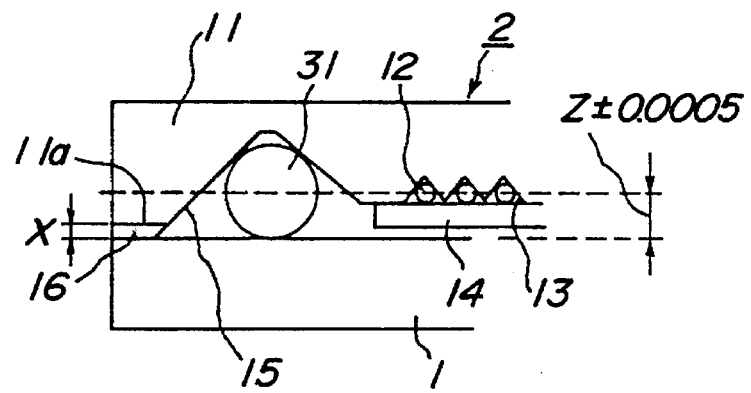

Finally, the thus obtained optical fiber array 2(3) is fixed on the element mount substrate 1 to obtain the optical module. That is to say, as shown in FIG. 4d, the optical fiber array 2(3) is arranged on the element mount substrate 1 under such a condition that the guide pin 31 is arranged in the guide groove 15. In this case, a space of the distance X is formed between the end portion 11a of the V-groove substrate 11 and the element mount substrate 1. Under such a condition, an optical axis adjustment between the optical fiber array 2(3) and the optical element such as the optical waveguide element 4 and the light receiving element 21 is effected by passing light therethrough as is the same as the known method. According to the present invention, since the optical axes thereof in the thickness direction are precisely identical with each other, it is possible to perform the optical axis adjustment by adjusting only a variation of a surface parallel to the element mount substrate and a variation of a rotation angle with respect to the surface mentioned above. Then, when the optical axis adjustment mentioned above is completed, the optical fiber array 2(3) is fixed to the element amount substrate 1 by forming the adhesive layer 16(17) in the space of the distance X therebetween.

In the embodiment mentioned above, the V-groove substrate 11 can be worked precisely to be the distance Z between the optical fiber 12 and the element mount substrate 1 on the order of sub-microns i.e. $Z \pm 0.5$ µm. Therefore, if the optical fiber array 2(3) is fixed to the element mount substrate 1 under the condition such that one point of the guide pin 31 is brought into contact with the element mount substrate 1 and the other two points of the guide pin 31 are brought into contact with the guide groove 15, it is possible to perform the optical axis adjustment between the optical fiber array 2(3) and the optical element easily, since their optical axes in the thickness direction are made identical with each other.

Moreover, also in the case that use is made of the other optical fiber array 3 as shown in FIG. 1, the optical fiber array 3 can be fixed to the element mount substrate 1 in the same manner after the optical fiber array 2 is fixed. In this case, as shown in FIG. 5, if the same guide pins 15 are used for connecting the optical fiber array 2, the optical axes of the optical fiber array 3 are automatically identical with those of the optical element 4. Therefore, it is not necessary to perform the optical axis adjustment for the optical fiber array 3, and thus it is possible to improve greatly the ease of assembly.

The present invention is not limited to the embodiments mentioned above, and various variations can be effected. In the embodiments mentioned above, the present invention is applied to the optical axis adjustment between the optical fiber array and the optical element, but it should be noted that the present invention can be applied to a fixing of only one optical fiber array to the substrate. If the present invention is applied to the fixing of only one optical fiber array, the same advantages mentioned above can be obtained.

As mentioned above in detail, according to the invention, since the optical fiber array is fixed to the element mount substrate under the condition such that the guide pin is arranged in the guide groove of the V-groove substrate and one point of the guide pin is brought into contact with the element mount substrate, it is possible to set a distance on the order of sub-microns between an upper surface of the element mount substrate and the optical fiber. Therefore, when the optical axis adjustment between the optical fiber of the optical fiber array and the optical element, both of which are fixed on the same element mount surface, is performed, it is possible to perform the optical axis adjustment easily, since the optical axes thereof are made identical with each other precisely in the thickness direction.

What is claimed is:

1. A method of fixing an optical fiber array to a receiving substrate, comprising the steps of:

providing a receiving substrate including a receiving surface;

providing an optical fiber array comprising (i) a V-groove substrate having at least one V-groove receiving at least one respective optical fiber, a pair of guide grooves respectively arranged on opposing lateral sides of the at least one V-groove, and lateral joining surfaces, said guide grooves respectively receiving a pair of guide pins, and (ii) a fix substrate for fixing said at least one optical fiber in said at least one V-groove; and securing said optical fiber array on said receiving substrate such that the joining surfaces of the V-groove substrate are adhered to the receiving substate by an adhesive layer, and each guide pin point-contacts said receiving surface and protrudes to a point beyond said joining surfaces as viewed in cross-section in a plane perpendicular to said receiving surface, wherein said fix substrate is secured to the V-groove substrate so as not to protrude beyond the guide pins as viewed in cross-section in a plane perpendicular to the receiving surface and said at least one optical fiber overlies at least a portion of said receiving surface.

2. The method according to claim 1, wherein an optical element having an optical axis is fixed on said receiving substrate, and the optical axis of said optical element is aligned with the optical axis of said at least one optical fiber of said optical fiber array.

3. The method according to claim 2, wherein said optical element comprises an element from the group consisting of an optical waveguide element, a light receiving element, and a light emitting element.

4. The method according to claim 1, wherein a plurality of said optical fiber arrays are fixed to the receiving substrate and the same guide pin is used for connecting said optical fiber arrays.

5. The method according to claim 1, wherein the optical axis of said at least one optical fiber is aligned with a center position of said guide pin.

* * * * *